United States Patent
Storm

(10) Patent No.: US 8,085,519 B2
(45) Date of Patent: Dec. 27, 2011

(54) CIRCUIT ARRANGEMENT FOR PROVIDING A DC OPERATING VOLTAGE

(75) Inventor: Arwed Storm, Dachau (DE)

(73) Assignee: Osram AG, Munich (DE)

( * ) Notice: Subject to any disclaimer, the term of this patent is extended or adjusted under 35 U.S.C. 154(b) by 619 days.

(21) Appl. No.: 12/223,821

(22) PCT Filed: Feb. 5, 2007

(86) PCT No.: PCT/EP2007/051070
§ 371 (c)(1),
(2), (4) Date: Aug. 11, 2008

(87) PCT Pub. No.: WO2007/093516
PCT Pub. Date: Aug. 23, 2007

(65) Prior Publication Data
US 2009/0034140 A1    Feb. 5, 2009

(30) Foreign Application Priority Data
Feb. 13, 2006  (DE) .......................... 10 2006 006 558

(51) Int. Cl.
*H02H 3/20* (2006.01)
(52) U.S. Cl. ..................................................... 361/91.8
(58) Field of Classification Search ................. 361/91.1; 315/307, 291, 116
See application file for complete search history.

(56) References Cited

U.S. PATENT DOCUMENTS

| | | | | |
|---|---|---|---|---|
| 5,140,229 A * | 8/1992 | Yagi et al. | ...... | 315/307 |
| 6,028,755 A * | 2/2000 | Saeki et al. | ...... | 361/91.1 |
| 6,388,397 B1 * | 5/2002 | Iwahori | ...... | 315/307 |
| 7,061,190 B2 * | 6/2006 | Twardzik | ...... | 315/291 |
| 7,196,479 B2 | 3/2007 | Storm | | |
| 7,633,275 B2 * | 12/2009 | Leyk et al. | ...... | 323/224 |

FOREIGN PATENT DOCUMENTS

| | | |
|---|---|---|
| DE | 40 37 722 C1 | 11/1991 |
| EP | 1 526 622 A2 | 4/2005 |

OTHER PUBLICATIONS

Petersen et al., "Reduction of Voltage Stresses in Buck-Boost-Type Power Factor Correctors Operating in Boundary Conductor Mode," APEC 2003 IEEE Appl. Power Elec. Conf., vol. 1, Conf. 18 pp. 664-670 (Feb. 9, 2003).

\* cited by examiner

*Primary Examiner* — Rexford Barnie
*Assistant Examiner* — Angela Brooks

(57) ABSTRACT

The invention relates to a circuit arrangement for providing an operating DC voltage from a mains voltage, more particularly to operating circuits comprising a clocked electronic converter. Such operating circuits are preferably used for lamps or other light sources. The present invention protects such circuit arrangements from transient mains overvoltages. As soon as a mains overvoltage occurs a diverter switch Th connects the voltage-sensitive switch S11 of the electronic converter to a storage capacitor C12.

6 Claims, 1 Drawing Sheet

CIRCUIT ARRANGEMENT FOR PROVIDING A DC OPERATING VOLTAGE

TECHNICAL FIELD

The present invention relates to circuit arrangements for providing a DC operating voltage from a mains voltage. In particular these circuits are operating circuits which contain a clocked electronic converter. Such operating circuits are preferably used for lamps or other light sources. The present invention is concerned with the protection of such circuit arrangements against mains overvoltage. Mains overvoltage is understood in the text which follows to mean a transient overvoltage which can result in destruction of the circuit arrangement. Values for the mains voltage which are permanently above a rated value are not taken into consideration.

PRIOR ART

Circuit arrangements which are provided for connection to a mains voltage are endangered by overvoltages which the mains voltage may have. Circuit arrangements which provide a DC operating voltage generally have a storage capacitor, at which the DC operating voltage for further circuit elements is present. In the prior art, circuit topologies are often used in which the storage capacitor is coupled to the mains voltage without current-limiting means, for example inductors. If the storage capacitor has a sufficiently high capacitance value, in this case the storage capacitor can absorb the energy of the mains overvoltage without the circuit arrangement being destroyed.

Furthermore, the prior art includes the use of varistors or suppressor diodes which change over to a conductive state when a predetermined voltage is exceeded and limit the mains voltage. The disadvantage of these means is the safe limitation of the mains voltage in the case of severe faults in the mains voltage. Often, operating circuits for lamps or other circuit arrangements for providing a DC voltage contain at least one switching transistor, whose dielectric strength is limited. A maximum voltage which is dependent on the type of switching transistor should not be exceeded at the switching transistor. In order to ensure this even in the case of a mains voltage which is subject to severe interference, a varistor or a suppressor diode needs to be designed so as to be correspondingly large. This results in large and expensive varistors or suppressor diodes. In this case the above-described method with the storage capacitor is better. However, this cannot be used in circuit topologies in which the storage capacitor is not directly coupled to the mains voltage.

DESCRIPTION OF THE INVENTION

The invention is based on the technical problem of providing a circuit arrangement which is protected against mains overvoltage without having the abovementioned disadvantages.

The invention is based on the knowledge that a storage capacitor can be used for limiting the voltage at a switching transistor by a dissipating switch connecting the switching transistor to the storage capacitor if there is a mains overvoltage.

In general, a circuit arrangement of the generic type has a rectifier, which makes available a rectified mains voltage at a first and a second mains terminal. Without limiting the universality, the first mains terminal is used as the reference potential. The rectified mains voltage feeds a clocked converter circuit, which usually makes available a DC operating voltage for operation of further circuit elements at a storage capacitor. The storage capacitor makes available the DC operating voltage with respect to the reference potential. The storage capacitor is therefore usually used as a buffer for the DC operating voltage and is accordingly already advantageously provided in generic circuit arrangements, even if the circuit arrangement does not contain the present invention. When implementing the invention, it is not absolutely necessary to use an already existing storage capacitor, however. A separate storage capacitor can also be used for the invention.

The clocked converter circuit comprises at least one switching transistor, which is coupled with a second working terminal to the reference potential. If a mains overvoltage occurs at the mains terminals, a voltage value can occur between the second working terminal of the switching transistor and a first working terminal of the switching transistor which results in destruction of the switching transistor.

A circuit arrangement according to the invention comprises a dissipating switch, which, in the case of a mains overvoltage, connects the first working terminal of the switching transistor to the storage capacitor and, as a result, prevents a rise in the voltage at the switching transistor to destructive values.

The invention is of particular use in so-called power factor correction (PFC) circuits, which are often used in modern operating devices for lamps. They are known to a person skilled in the art per se and are therefore not explained in detail here. Such power factor correction circuits also usually contain a storage inductor in addition to a switching transistor. In these cases, the switching transistor is also endangered by saturation currents of the storage inductor as a result of transient faults.

Particularly preferred is the use of the invention in so-called step-down converters, which produce lower voltages than the supply voltage amplitude. A particularly preferred example, which can function both as a step-up converter and as a step-down converter and therefore in the sense of this invention is considered to be a step-down converter, is a SEPIC converter. The principle of the SEPIC converter will not be explained in detail here either. Instead, reference is made to the literature and, by way of example, to the German patent application 101 10 239.9.

A further aspect of the present invention relates to the implementation of the dissipating switch. Advantageously, it is implemented by a thyristor, which is triggered by a driver circuit, which prevents breakover triggering of the thyristor. This takes place by means of a negative voltage being applied to the gate of the thyristor as long as it is not intended to be triggered, the negative voltage being obtained from an auxiliary inductor, which is magnetically coupled to the storage inductor.

In the text which follows, inductors are described by the letter L, capacitors by the letter C, resistors by the letter R, terminals by the letter J and switches by the letter S, in each case followed by a number.

PREFERRED EMBODIMENT OF THE INVENTION

Figure 1:
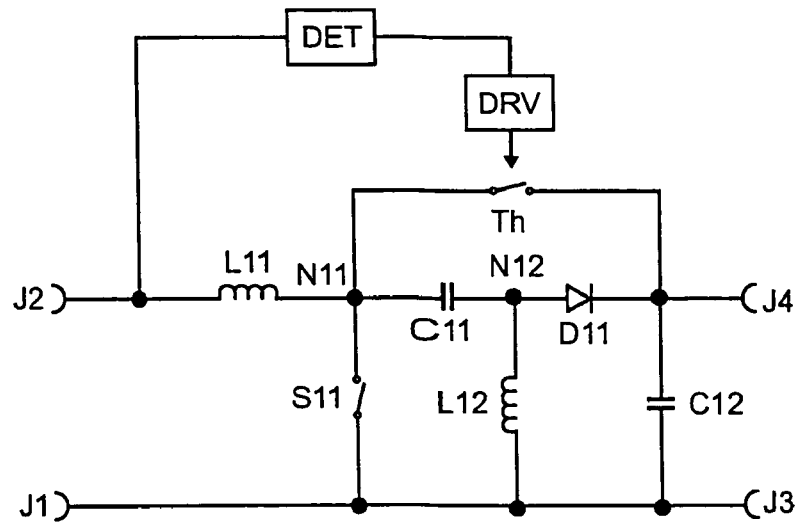
FIG. 1 shows a circuit diagram of a circuit arrangement which is the subject of the invention.

FIG. 1 shows an exemplary embodiment of a circuit arrangement according to the invention. In the exemplary embodiment, a SEPIC is selected as the clocked converter. However, a person skilled in the art can also apply the invention to other types of converter such as, for example, a boost converter.

Terminals J1 and J2 represent the mains inputs, to which a rectified mains voltage can be connected. The circuit arrangement can provide a DC operating voltage at the terminals J3 and J4. A storage capacitor C12 is connected between the terminals J3 and J4 and, in addition to the function according to the invention, as described below, is used for buffering the DC operating voltage. The terminals J1 and J3 are connected and form a reference potential.

A storage inductor L11, a switching transistor S11, a second storage capacitor C11, a second storage inductor L12 and a freewheeling diode D11 form a SEPIC known from the literature. In the order specified, the storage inductor L11, the second storage capacitor C11 and the freewheeling diode D11 are connected in series between the mains terminal J2 and the terminal J4. A first node N11 is formed between the storage inductor L11 and the second storage capacitor C11, and a second node N12 is formed between the storage capacitor C11 and the freewheeling diode. The switching transistor S11 is connected between the first node N11 and the reference potential. The second storage inductor L12 is connected between the second node N12. The operation of the SEPIC is not essential to the present invention and is therefore not described.

A dissipating switch Th is connected between the first node N11 and the terminal J4. The dissipating switch Th therefore lies between a second working terminal of the switch S11 and a second terminal of the storage capacitor C12.

A driver circuit DRV controls the dissipating switch Th with a switching signal at a control terminal of the dissipating switch Th. The driver circuit DRV is coupled to a detector circuit DET, which in turn is coupled to the mains terminal J2. The driver circuit DRV and the detector circuit DET can be combined to form an evaluation circuit.

According to the invention, the evaluation circuit is designed in such a way that it closes the dissipating switch Th for the case in which the voltage or the voltage rise between the terminals J1 and J2 is above a given limit value. The task of the evaluation circuit can be split into the detection of the mains voltage and the driving of the dissipating switch.

The detection is carried out in FIG. 1 by the detector circuit DET. Numerous threshold value circuits are available to a person skilled in the art for implementation. The detection of a voltage rise is also conventional to a person skilled in the art.

For example, for this purpose a high-pass filter can be connected upstream of a threshold value circuit. In addition to the detection of the voltage value, detecting its rise is also advantageous since, as a result, the dissipating switch closes early in the event of a rapid rise. Detection of the voltage value alone can, owing to unavoidable switching times, result in the dissipating switch only closing when the mains voltage has already reached a value which results in destruction of the switching transistor S11.

The driver circuit DRV converts the information from the detector circuit DET into a switching signal, which is suitable for driving the dissipating switch Th. Since in principle all electronic switches are possible for the dissipating switch Th, a person skilled in the art must select a driver circuit DRV which is appropriate for the type of dissipating switch Th.

If the voltage or the voltage rise at the terminal J2 reaches values which could lead to destruction of the switch S11, the dissipating switch connects the storage capacitor C12 in parallel with the switch S11 to be protected. The energy of this mains overvoltage therefore charges the storage capacitor C12. Generally, storage capacitors have values in the region of a few microfarads. The energy which transient mains overvoltages generally have only results in a voltage rise of a few volts at the storage capacitor C12, which does not represent a risk for the switching transistor S11. If an electrolyte capacitor is selected for the storage capacitor C12, its known zener effect can also be used.

Advantageously, a thyristor is used for the dissipating switch Th since even inexpensive thyristors can carry high currents. It is also advantageously possible to make use of a thyristor's property of extinguishing itself.

Figure 2:
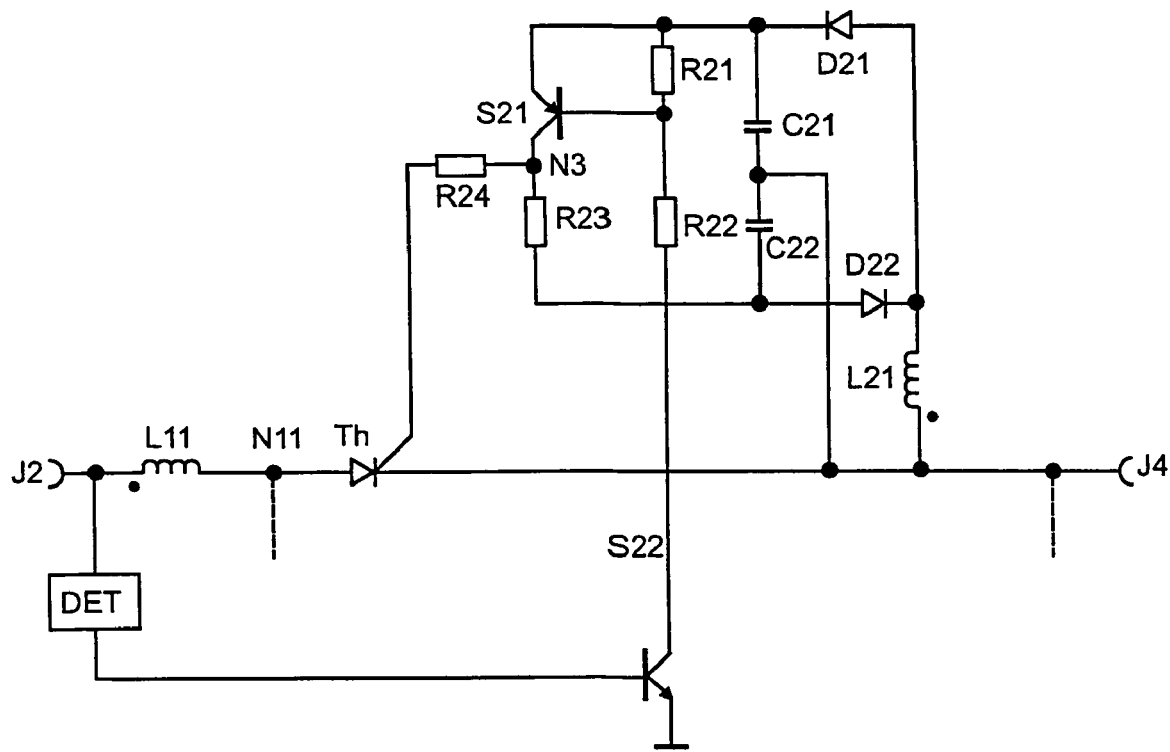
FIG. 2 shows a circuit diagram for implementing a dissipating switch, as is suitable for a circuit arrangement according to the invention.

FIG. 2 shows an exemplary embodiment of a driver circuit which is suitable for driving a thyristor which is used for the dissipating switch Th. When using a thyristor, it is necessary to take care that it is not triggered by known, undesirable breakover triggering. Whenever the switching transistor S11 opens, the voltage at the anode of the thyristor increases rapidly and there is the risk of breakover triggering. The risk is particularly high when first using a circuit arrangement according to the invention. The storage capacitor C12 at the output of the voltage converter is still discharged on first use, with the output voltage being zero. This results in a high instantaneous voltage between the anode and the cathode of the thyristor and the risk of breakover triggering.

In order to prevent this, the driver circuit shown in FIG. 2 applies a negative voltage at the gate of the thyristor Th with respect to the cathode of the thyristor Th whenever a control switch S22 is open, i.e. whenever no triggering of the thyristor Th is desired as a result of a lack of mains overvoltage. The control switch S22 is a bipolar transistor, whose base is coupled to the detector circuit DET. If the detector circuit registers a mains overvoltage, it emits a signal to the control switch S22, and this signal switches the control switch to the conductive state and therefore initiates triggering of the thyristor Th. If there is no mains overvoltage, a negative voltage is present at the gate of the thyristor Th.

This is achieved in accordance with FIG. 2 by an auxiliary inductor L21, which is DC-coupled to the cathode of the thyristor Th with its first terminal, the auxiliary inductor L21 being magnetically coupled to the storage inductor L11 in such a way that a negative protective voltage with respect to its first terminal is present at its second terminal if a negative voltage with respect to the input terminal J2 is present at the storage inductor L11.

The negative protective voltage charges a capacitor C22 via a diode D22. The voltage at C22 is connected between the gate and the cathode of the thyristor via a series circuit of resistors R23 and R24. A third node N3 is formed between R23 and R24.

A positive voltage at the auxiliary inductor charges a capacitor C21 via a diode D21. The voltage at C21 is connected between the gate and the cathode of the thyristor Th via an auxiliary switch S21, the node N3 and R24. As long as S21 is open, a negative voltage is present at the gate, as a result of which breakover triggering is avoided. As soon as S21 closes, the thyristor Th is triggered by the positive voltage at C21.

In the exemplary embodiment shown in FIG. 2, the auxiliary switch S21 is formed by a PNP bipolar transistor, which is coupled with the emitter to C21 and with the collector to the third node N3. A resistor R21 is connected between the base and the emitter. The control switch S22 is an NPN bipolar transistor which is connected with its emitter to the reference potential M. The collector of S22 is connected to the base of S21 via a resistor R22. The base of S22 is connected to the detector circuit DET.

As long as the detector circuit DET is not emitting a signal, S22 is open, as a result of which S21 is also open and a negative voltage is present at the gate of the thyristor. There is no mains overvoltage.

If there is a mains overvoltage, the detector circuit DET switches the control switch S22 on, as a result of which S21 also turns on and triggers the thyristor. The switch S11 of the converter is protected.

The circuit arrangement comprising R21, R22, R23, R24, S22 and S21 is known in the literature as a bootstrap circuit. This circuit is used if a switch whose drive signal is not related to ground, such as in the present case the gate of the thyristor, is intended to be switched by a signal from a control device which is related to ground. This signal which is related to ground in the present case comes from the detector circuit DET. The bootstrap circuit in FIG. 2 should only be understood as being an example. Similarly, other bootstrap circuits common to a person skilled in the art can also be used. For example, the bootstrap circuit can be designed to have field effect transistors or the potential difference which is bridged in the example by S22 can be bridged by a transformer.

The provision of a positive and a negative voltage at C21 and C22 is essential. Desirable is the bootstrap circuit which connects either the positive or the negative voltage to the gate of the thyristor, depending on the detector circuit DET.

The converter, for example the SEPIC from FIG. 1, is connected at the first node N11 and at the terminal J4. This is indicated in FIG. 2 by dashed lines. Here, in each case the node N11 and the terminal J4 from FIG. 1 and FIG. 2 correspond to one another.

The invention claimed is:

1. A circuit arrangement for providing a DC operating voltage from a mains voltage with
   a first mains input (J1) and a second mains input (J2) for connecting a rectified mains voltage,
   a clocked converter circuit (L11, S11, C11, D11, L12) with at least one switching transistor (S11) with a first and a second working terminal, the first working terminal being coupled to the first mains input (J1),
   a storage capacitor (C12), with a first and a second terminal, the first terminal of the storage capacitor being coupled to the first mains input (J1),
   an evaluation circuit (DET, DRV), which evaluates the voltage between the mains inputs (J1, J2) in such a way that, when a given voltage value or voltage rise is exceeded, the evaluation circuit (DET, DRV) emits a switching signal,
   the switching arrangement being characterized in that
   it has a dissipating switch (Th) with a first working terminal, a second working terminal and a control terminal,
   the first working terminal of the dissipating switch (Th) being coupled to the second working terminal of the switching transistor (S11), the second working terminal of the dissipating switch (Th) being coupled to the second terminal of the storage capacitor (C12), and the switching signal being present at the control terminal,
   wherein a storage inductor (L11) is connected between the second mains input (J2) and the first working terminal of the dissipating switch (Th),
   wherein the dissipating switch (Th) comprises a thyristor (Th), and the evaluation circuit comprises a driver circuit (DRV), which provides the control signal at the gate of the thyristor (Th),
   the driver circuit (DRV) being designed in such a way that the control signal is negative with respect to the cathode of the thyristor (Th) in the time in which the driver circuit (DRV) is not triggering the thyristor.

2. The circuit arrangement as claimed in claim 1, characterized in that
   the driver circuit (DRV) has the following features:
   an auxiliary inductor (L21), which is connected with its first terminal to the cathode of the thyristor (Th), the auxiliary inductor (L21) being magnetically coupled to the storage inductor (L11) in such a way that there is a negative voltage with respect to its first terminal at its second terminal if a negative voltage with respect to the second mains input (J2) is present at the storage inductor (L11),
   a series circuit, which is connected in parallel with the auxiliary inductor (L21) and comprises a first auxiliary capacitor (C22) and a first auxiliary diode (D22), the cathode of the first auxiliary diode (D22) being connected to the second terminal of the auxiliary inductor (L21) and the node between the first auxiliary diode (D22) and the first auxiliary capacitor (C22) being coupled to the gate of the thyristor (Th),
   a series circuit, which is connected in parallel with the auxiliary inductor (L21) and comprises a second auxiliary capacitor (C21) and a second auxiliary diode (D21), the anode of the second auxiliary diode (D21) being connected to the second terminal of the auxiliary inductor (L21), and the node between the second auxiliary diode (D21) and the second auxiliary capacitor (C21) being coupled to the gate of the thyristor (Th) via an auxiliary switch (S21), a detector circuit (DET) causing the auxiliary switch (S21) to close if a mains overvoltage is present at the mains inputs (J1, J2).

3. The circuit arrangement as claimed in claim 2, characterized in that the storage capacitor is coupled to a further converter, which is suitable for operating a lamp.

4. The circuit arrangement as claimed in claim 1, characterized in that the storage capacitor is coupled to a further converter, which is suitable for operating a lamp.

5. A circuit arrangement for providing a DC operating voltage from a mains voltage with
   a first mains input (J1) and a second mains input (J2) for connecting a rectified mains voltage,
   a clocked converter circuit (L11, S11, C11, D11, L12) with at least one switching transistor (S11) with a first and a second working terminal, the first working terminal being coupled to the first mains input (J1),
   a storage capacitor (C12), with a first and a second terminal, the first terminal of the storage capacitor being coupled to the first mains input (J1),
   an evaluation circuit (DET, DRV), which evaluates the voltage between the mains inputs (J1, J2) in such a way that, when a given voltage value or voltage rise is exceeded, the evaluation circuit (DET, DRV) emits a switching signal,
   the switching arrangement being characterized in that
   it has a dissipating switch (Th) with a first working terminal, a second working terminal and a control terminal,
   the first working terminal of the dissipating switch (Th) being coupled to the second working terminal of the switching transistor (S11), the second working terminal of the dissipating switch (Th) being coupled to the second terminal of the storage capacitor (C12), and the switching signal being present at the control terminal,
   wherein the clocked converter circuit is a SEPIC or a boost converter,
   wherein a storage inductor (L11) is connected between the second mains input (J2) and the first working terminal of the dissipating switch (Th), wherein the dissipating switch (Th) comprises a thyristor (Th), and the evaluation circuit comprises a driver circuit (DRV), which provides the control signal at the gate of the thyristor (Th), the driver circuit (DRV) being designed in such a way that the control signal is negative with respect to the cathode of the thyristor (Th) in the time in which the driver circuit (DRV) is not triggering the thyristor.

6. The circuit arrangement as claimed in claim 5, characterized in that the driver circuit (DRV) has the following features:

an auxiliary inductor (L21), which is connected with its first terminal to the cathode of the thyristor (Th), the auxiliary inductor (L21) being magnetically coupled to the storage inductor (L11) in such a way that there is a negative voltage with respect to its first terminal at its second terminal if a negative voltage with respect to the second mains input (J2) is present at the storage inductor (L11), a series circuit, which is connected in parallel with the auxiliary inductor (L21) and comprises a first auxiliary capacitor (C22) and a first auxiliary diode (D22), the cathode of the first auxiliary diode (D22) being connected to the second terminal of the auxiliary inductor (L21) and the node between the first auxiliary diode (D22) and the first auxiliary capacitor (C22) being coupled to the gate of the thyristor (Th), a series circuit, which is connected in parallel with the auxiliary inductor (L21) and comprises a second auxiliary capacitor (C21) and a second auxiliary diode (D21), the anode of the second auxiliary diode (D21) being connected to the second terminal of the auxiliary inductor (L21), and the node between the second auxiliary diode (D21) and the second auxiliary capacitor (C21) being coupled to the gate of the thyristor (Th) via an auxiliary switch (S21), a detector circuit (DET) causing the auxiliary switch (S21) to close if a mains overvoltage is present at the mains inputs (J1, J2).

* * * * *